United States Patent [19]

Swales et al.

[11] Patent Number: 5,158,999

[45] Date of Patent: Oct. 27, 1992

[54] FLAME RETARDANTS

[75] Inventors: Timothy G. Swales, St. Paul, Minn.; Alan J. Lindsay, Cheshunt, United Kingdom; Linda M. Doolan, Kingston, Jamaica

[73] Assignee: Minnesota Mining and Manufacturing Company, St. Paul, Minn.

[21] Appl. No.: 566,559

[22] Filed: Aug. 13, 1990

[51] Int. Cl.$^5$ ............................................. C08K 5/34
[52] U.S. Cl. .................................. 524/100; 524/139; 524/414; 524/416; 544/195; 544/214; 528/399; 252/609; 525/330.4; 525/340
[58] Field of Search ................ 544/195, 214; 252/609; 524/100, 139, 414, 416; 528/399; 525/330.9, 340

[56] References Cited

U.S. PATENT DOCUMENTS

| | | | |
|---|---|---|---|
| 3,269,963 | 8/1966 | Ilgemann et al. | 524/139 |
| 3,594,346 | 7/1971 | Hermann et al. | 524/139 |
| 3,931,104 | 1/1976 | Luders et al. | 524/139 |
| 4,001,177 | 1/1977 | Tsutsumi et al. | 524/101 |
| 4,062,909 | 12/1977 | Morgan et al. | 524/100 |
| 4,080,501 | 3/1978 | Leman et al. | 524/100 |
| 4,112,016 | 9/1978 | Moulds | 524/100 |
| 4,140,660 | 2/1979 | Den Otter et al. | 514/101 |
| 4,278,588 | 7/1981 | Granzow | 524/139 |
| 4,293,464 | 10/1981 | Granzow | 514/139 |
| 4,373,103 | 2/1983 | Jung et al. | 514/100 |

*Primary Examiner*—Kriellion S. Morgan
*Attorney, Agent, or Firm*—Gary L. Griswold; Walter N. Kirn; Darla P. Neaveill

[57] ABSTRACT

Compounds having a nucleus of general formula (I):

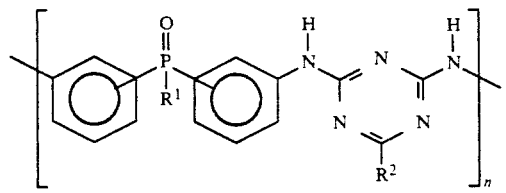

in which:

n is an integer and has a value of at least 2;

$R^1$ represents an alkyl group comprising up to 20 carbon atoms; and $R^2$ represents

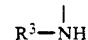

where $R^3$ represents an alkyl group comprising up to 20 carbon atoms or an aryl nucleus comprising up to 10 carbon atoms, or $R^2$ represents a heterocyclic ring nucleus comprising from 4 to 8 ring atoms, at least one atom comprising nitrogen and linking the ring nucleus to the triazine ring. Compounds of formula (I) are suitable for use as a flame retardant additive for polymer materials, particularly when used in combination with a second and different source of phosphorus. The flame retarded polymers are particularly suitable for use in wire and cable insulation, dimensionally recoverable products, molded parts, extruded tubings, pipes and tape type constructions.

12 Claims, No Drawings

FLAME RETARDANTS

FIELD OF THE INVENTION

This invention relates to flame retardant additives for polymer materials and in particular to non-halogen containing compounds suitable for use as flame retardant additives for polyolefin and other types of polymers. In a further aspect this invention also relates to a method of synthesis of the compounds.

BACKGROUND TO THE INVENTION

Electrical fires in machinery frequently arise from an electrical fault causing ignition and combustion of polymer materials such as the insulating cladding of wires and cables. Such fires are a serious problem presenting a potential hazard to both workers and property, not only from the fire but also from the evolution of toxic gases derived from thermal degradation of the polymer materials. The problem may be compounded when access to the point of ignition is physically restricted, e.g., within machines, circuitry etc., thereby limiting manual attempts to extinguish or even recognise the fire. Accordingly, there has been much interest in the development of polymer compositions having improved resistance to combustion.

It is known that blending certain compounds into the pre-polymer composition may have a flame retarding effect on the combustion of the final polymer products. Halogen-containing flame retardant additives are known and have been used to reduce the flammability of polymers such as polyvinyl chloride. However, there is an increasing awareness of the problems associated with halogenated flame retardants. These retardants are known to cause both high smoke generation and the emission of toxic and corrosive gases which may damage adjacent circuitry etc. These gases may also have wider reaching deleterious environmental effects. Alternatives to halogenated retardants can be broadly classed into either (a) phosphorus based retardants or (b) non-phosphorus based retardants.

Most non-phosphorus materials comprise inert filler materials such as calcium carbonate which have little effect. Some inorganic salts, e.g., alumina trihydrate, magnesium hydroxide and magnesium carbonate, have been used as flame retardant additives for polyolefin polymers. Unfortunately such salts require high loading by weight of the polymer composition to achieve the desired flammability performance. This high loading is found to have a negative effect on the physical properties of the polymer, e.g., tensile strength. Additionally salts such as alumina trihydrate have poor thermal stability.

The use of phosphorus based retardants is known, particularly the use of inorganic phosphates to generate intumescent formulations which cause the formation of a protective foamed char when exposed to heat thereby preventing further combustion. Such formulations have generally found applications in cellulosic type materials, resins and formulations containing low molecular weight polyols for paints and other such coating materials. Various combinations of phosphorus containing compounds are disclosed in, for example, Chemical Abstracts 92 111554 and 96 143939; U.S. Pat. Nos. 3810862, 4001177, 4140660, 4198493, 4341694, 4433115, 4491644 and 4742088; P.C.T. No. WO85/00220; British Patent Nos. 2142638 and 218114; Australian Patent Application No. 77342/87 and European Patent Nos. 0026391, 0045835 and 0115871. Such prior art retardants are found to suffer from one or more of the following disadvantages:

a) water sensitivity, b) migration of the additive due to non-compatibility between the component compounds and the polymer matrix, c) the deleterious action of the additive on the physical properties of the polymer, and d) those retardants used successfully have a high specificity. For example, U.S. Pat. No. 4,491,644 discloses an additive comprising a blend of bis-melaminium pentate and a polyhedric oxide formulated for use principally in polypropylene. Such materials are commercially available under the trade name Charguard 329. Likewise, materials in accordance with European Patent No. 0115871, comprising a nitrogen containing oligomer and ammonium polyphosphate, commercially available under the trade name Spinflam MF82, are produced in grades specific to a particular polymer, e.g., polyethylene.

Thus, there is a need for a high performance method of flame retardation for use in polymers.

BRIEF SUMMARY OF THE INVENTION

Alternative compounds have now been found which are suitable for use in a flame retardant additive for polymer materials having reduced smoke generation, reduced evolution of corrosive gas and improved flammability properties. The compounds are compatible with a variety of polymers applicable for wire and cable insulation, heat recoverable items and molded parts.

According to the present invention there is provided a compound having a nucleus of general formula (I):

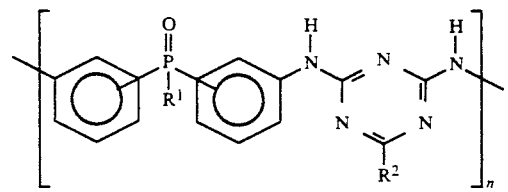

in which:

n is an integer and has a value of at least 2;

$R^1$ represents an alkyl group comprising up to 20 carbon atoms; and $R^2$ represents

where $R^3$ represents an alkyl group comprising up to 20 carbon atoms or an aryl nucleus comprising up to 10 carbon atoms; or $R^2$ represents a heterocyclic ring nucleus comprising from 4 to 8 ring atoms, at least one atom comprising nitrogen and linking the ring nucleus to the triazine ring.

The compounds of formula (I) are suitable for use as flame retardant additives in polymer materials particularly when used in combination with a second and different source of phosphorus resulting in an additive having reduced smoke generation, reduced evolution of corrosive gas and improved flammability properties. The compounds are compatible with a variety of polymers applicable for wire and cable insulation, heat recoverable items and molded parts.

In formula (I), the phenyl rings may independently have an ortho, meta or para substitution pattern, but the all-meta-substituted pattern is preferred. Preferred compounds have a nucleus of general formula (II):

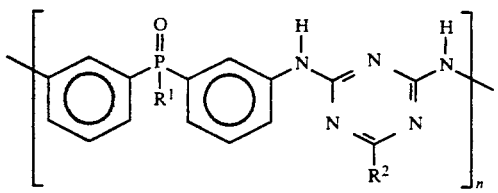

in which:

R¹, R² and n are as defined earlier.

DESCRIPTION OF PREFERRED EMBODIMENTS

Compounds of formula (I) are phosphorus/nitrogen containing oligomers (P/N oligomers) comprising a number of repeating units, the number of which is defined by n.

n is an integer and has a value of at least 2. Generally n has a value of from 2 to 25, preferably from 2 to 20 and more preferably 2 to 12.

$R^1$ represents an alkyl group of 1 to 20 carbon atoms, more preferably 1 to 10 carbon atoms and most preferably 1 to 5 carbon atoms. Preferred examples of groups represented by $R^1$ include methyl and ethyl groups.

$R^2$ represents

in which $R^3$ represents an alkyl group, generally of 1 to 20 carbon atoms but more preferably 1 to 10 carbon atoms, or an aryl nucleus of up to 10 carbon atoms, preferably a phenyl nucleus. $R^2$ may also represent a heterocyclic ring nucleus, generally comprising from 4 to 8 non-metallic ring atoms, of which at least one atom must comprise nitrogen and link the ring nucleus to the triazine ring. (the remainder of the ring atoms being selected from C, O, S and Se, more preferably only C). Preferred examples of suitable ring nuclei comprise piperidine, pyrrolidine and triazole rings.

Groups represented by $R^1$, $R^2$ and $R^3$ may optionally possess one or more non-halogenated substituents.

The P/N oligomers of general formula (I) have a particular utility in a flame retardant additive suitable for use in polymers, especially polyolefin polymers. The additive is formulated by blending a compound of formula (I) with a source of phosphorus.

The second source of phosphorus may comprise any inorganic or organic phosphorus source known to the art which does not deleteriously alter the properties of the polymer to which it is added. Preferred examples of the phosphorus source comprise ammonium polyphosphate (commercially available under the trade name Phoscheck P30 from Monsanto), melamine phosphate (commercially available under the trade name Amgard NH from Albright and Wilson) and red phosphorus. The phosphate source may optionally be encapsulated, e.g., in a water-insoluble resin. A preferred example is ammonium polyphosphate in melamine formaldehyde (commercially available under the trade name Exolit 462 from Hoechst-Celanese).

Crosslinked versions of the P/N oligomer (I) may be used in the flame retardant additives of the present invention and can be obtained by crosslinking successive oligomers via the secondary amine group of $R^2$, i.e.,

or when $R^2$ represents a heterocyclic ring the use of a difunctional ring nucleus, e.g., 4-aminopiperidine.

The weight ratio of phosphorus source to P/N oligomer (I) is dependent on the flammability of the polymer composition which is to be flame retarded and the level of flame retardance to be achieved but preferably is from 4:1 to 1:4 and more preferably from 2:3 to 1:4.

The particle size of the P/N oligomer and the phosphorus source is important both for flammability performance and for the physical properties of the flame retarded polymer material. Preferably both additive components have an average particle size of less than 80 μm, more preferably less than 40 μm. Conventional methods to obtain these particle sizes include sizing using sieves, ball milling and jet milling. Alternatively during the preparation of the P/N oligomers of formula (I) precipitation of the final product can be optimised to minimise particle size.

Due to the high thermal stability of the flame retardant additive of the present invention it is possible to flame retard a wide range of polyolefins and other polymers. Preferred examples include low density polyethylene (LDPE), high density polyethylene (HDPE), linear, low density polyethylene (LLDPE), poly (ethylene/ethyl acrylate) (EEA), poly (ethylene/vinyl acetate) (EVA), polypropylene (PP), ethylene-propylene-diene monomers (EPDM) and co-polymers thereof. It is also possible to flame retard hydroxyl containing olefin co-polymers, as well as epoxy (and other thermosetting) resins.

The choice of polymer, i.e., flammability, melt index (ASTM) and co-polymer content will affect the quantity of flame retardant added as will the level of flame retardance to be achieved. Generally the total flame retardant loading by weight is from 10 to 60% of the total composition, preferably from 20 to 50%.

The polymeric compositions of this invention comprising the P/N oligomer of formula (I) and the polymer may be crosslinked, for example, either chemically or by high energy radiation. Examples of chemical crosslinking include the use of free radical initiators such as dicumyl peroxide together with co-curing agents, e.g., triallyl isocyanurate, or by using silane crosslinking technology, e.g., products commercially available under the trade names Monsil and Sioplas from Maillerfer and Dow Corning respectively. Crosslinking by high energy radiation can be achieved, for example, by irradiating with an electron beam. Radiation doses in the range 2 to 40 Mrads, preferably 10 to 20 Mrads are appropriate. To promote crosslinking during irradiation, radical promoters such as triallyl isocyanurate can be used. Compositions of this invention are particularly suitable for use in crosslinked EEA formulations.

Surface treatments may be used to increase the coupling between the flame retardant additive composition and its polymer host matrix. Materials such as zircoaluminates and titanates can be used or, more commonly, silane coupling agents.

Other additives, for example, smoke suppressants, antioxidants, heat stabilisers, UV stabilisers etc., can be added. However, care must be exercised in the selection of these additives so that they do not interfere with the flame retardant mechanism of the P/N oligomers of formula (I). Basic oxides such as magnesium oxide and zinc oxide are found to be particularly detrimental in large enough concentrations. Similarly additives which contain water of hydration, for example, alumina trihydrate can also be inhibiting in large enough concentrations.

Polymer materials comprising flame retardant additives of the present invention can be processed using conventional methods, e.g., mixing by Banbury or two-roll mill and extruded or molded either by compression or injection methods. The flame retarded polymers are particularly suitable for use in wire and cable insulation, dimensionally recoverable products, especially heat recoverable products, molded parts, extruded tubings, pipes and tape type constructions where high levels of flame retardancy together with evolution of low quantities of smoke and corrosive combustion products are required.

Dimensionally recoverable products are ones which by appropriate treatment can alter their dimensions. In the case of heat recoverable products this treatment would be heat. Compositions of this invention where the polymer is crosslinked EEA are particularly useful in preparation of flexible flame retardant heat recoverable tubing.

Compounds of general formula (I) can be prepared by the reaction of the bis-(aminophenyl) alkyl phosphine oxides with 2,6-dichloro-4-substituted-1,3,5-triazines. These compounds have good thermal stability enabling them to be easily processed with polyolefins and other polymers.

The general reaction scheme is:

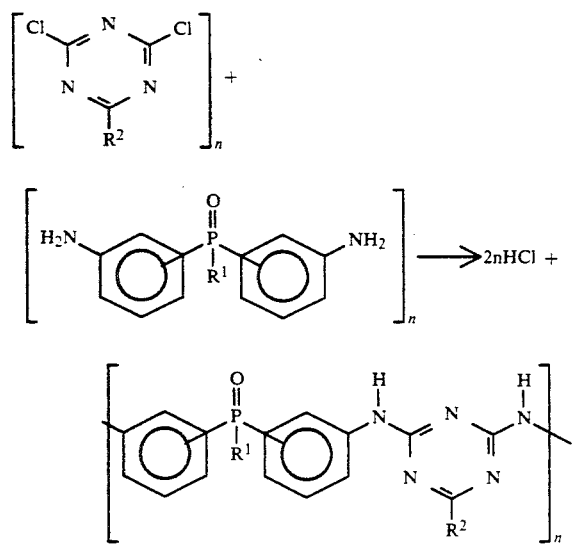

in which:

n, $R^1$ and $R^2$ are as defined above.

The reaction is generally conducted at a temperature of 80° C. for twelve hours followed by heating to 145° C. for 1.5 hours, refluxing for a further 1 to 2 hours in the presence of an organic solvent such as dimethyl formamide (DMF), precipitating the product with a non-solvent, and finally heating the dried solid at about 200° C. for several hours.

The invention will now be described with reference to Examples 1 to 15 in which polyolefins and flame retardant additives are compounded either using a steam heated Farrel Bridge two-roll mill at 140° C. for LDPE and 90° to 100° C. for EEA or mixed using a Brabender Plasticorder Torque rheometer, with a 30 centimeter internal mixing head, for two minutes at 100° C. (EEA) and 140° C. (LDPE). Test pieces were produced by compression molding using a Gem hydraulic press. Conditions employed were 110° C. for ten minutes (EEA) and 150° C. for twenty minutes (LDPE) with twelve ton pressure. In Example 15, representative epoxy formulations consisting of Epikote 815 and 2,4,6-tris (dimethylaminomethyl) phenol (2:1) and flame retardant additives were mixed by hand and cured at 90° C. for 30 minutes and at 110° C. for 18 hours. All percentage loadings parts and ratios are by weight unless otherwise stated.

Polymer flammability performance in the Examples is determined using the Underwriter's Laboratory UL94 vertical bar flame test. This is a widely accepted test method and is commonly used by suppliers of flame retardants and flame retarded materials. In this test a vertically clamped specimen bar is ignited by a bunsen flame. According to part 2 of UL94 three levels of performance are defined, designated V-0, V-1 and V-2, of which V-0 is the most stringent. In the Examples samples not achieving V-0, V-1 or V-2 are defined as fail. UL94 defines the specimen size as 12.7 cm (5") long and 1.27 cm (½") wide. The thickness of the sample must be no greater than 0.32 cm (⅛"). UL94 performance obviously depends on specimen thickness and is generally quoted for 0.16 cm (1/16") or 0.32 cm (⅛").

Smoke density comparisons were made using a Stanton Redcroft FTB smoke chamber attached to the Stanton Redcroft FTA Oxygen Index instrument on which Limiting Oxygen Index (LOI) measurements were made. The LOI test method is fully described in ASTM D 2863, but in general terms, the LOI defines the minimum concentration of oxygen which will support candle-like combustion of the test materials. Hence a high value indicates good flame retardance. Combustion gas corrosivity was determined by placing copper coated microscope slides in the above FTB smoke chamber and allowing to stand in the products of combustion for sixteen hours.

A Stanton Redcroft Cone Calorimeter was used to measure the rate of heat release, smoke density and carbon monoxide (CO) production as a function of time. Generally speaking, the lower the values the better. All cone calorimetry test pieces were 100×100×3 mm and a heat flux of 50 kW/m² was routinely employed.

EXAMPLE 1

Preparation of triazine oligomer (Compound A)

2,6-Dichloro-4-piperidine-1,3,5-triazine (2.384 g, 0.011 moles) and bis-(3-aminophenyl) methyl phosphine oxide (2.651 g, 0.011 moles) were placed in a round bottomed flask in 32 ml of DMF and heated to 80° C. overnight. The solution was then heated to 145° C. for 1.5 hours and refluxed for 1 hour. The brown solution was precipitated into water and the resulting cream solid filtered and dried under vacuum overnight. The product was crushed and heated at 200° C. for 3 hours for final drying.

(Yield 5.431 g): IR(KBr) $\mu_{(NH)}=3400$ cm$-1$, $\mu_{(CH)}=2900$ cm$-1$, $\mu_{(P=O)}=1170$ cm$-1$. TGA-onset 300° C.

EXAMPLE 2

Preparation of triazine oligomer (Compound B)

2,6-Dichloro-4-piperidine-1,3,5-triazine (9.536 g, 0.042 moles) and bis-(3-aminophenyl)ethyl phosphine oxide (10.604 g, 0.045 moles) were placed in a round bottomed flask in 128 ml of DMF and heated to 80° C. overnight. The mixture was then heated to 145° C. for 1.5 hours and refluxed for 1 hour. The brown solution was precipitated into water and the resulting cream solid filtered and dried overnight. The product was crushed and heated at 200° C. for 3 hours for final drying.

(Yield 16.019 g): IR(KBr) $\mu_{(NH)}=3400$ cm$-1$, $\mu_{(CH)}=2900$ cm$-1$, $\mu_{(P=O)}=1170$ cm$-1$. TGA-onset 300° C.

EXAMPLE 3

Preparation of triazine oligomer (Compound C)

2,6-Dichloro-4-pyrrolidine-1,3,5-triazine (6.404 g, 0.029 moles) and bis-(3-aminophenyl) methyl phosphine oxide (7.740 g, 0.031 moles) were placed in a round bottomed flask in 95 ml of DMF and heated to 80° C. overnight. A brown viscous material was formed and an additional 20 ml of DMF was added to aid stirring. The solution was then heated to 145° C. for 1.5 hours and refluxed for a further 2 hours. The brown solution was precipitated into water and the resulting cream solid filtered and dried under vacuum overnight. The product was crushed and heated at 200° C. for 3 hours for final drying.

(Yield 9.700 g): IR(KBr) $\mu_{(NH)}=3400$ cm$-1$, $\mu_{(CH)}=2900$ cm$-1$, $\mu_{(P=O)}=1170$ cm$-1$. TGA-onset 300° C.

EXAMPLE 4

Preparation of Triazine Oligomer (Compound D)

2,6-Dichloro-4-(1,2,4-triazole)-1,3,5-triazine (4.340 g, 0.020 moles) and bis-(3-aminophenyl) methylphosphine oxide (5.300 g, 0.022 moles) were placed in a round bottomed flask in 64 ml of DMF and heated to 80° C. overnight. The mixture was then heated to 145° C. for 4.5 hours. The resulting solution was concentrated to 40 ml and precipitated into water. The resulting cream product was filtered and dried overnight at 70° C. in vacuo. The dried product was ground to a fine powder and heated to 200° C. for 3 hours for final drying.

(Yield 6.400 g): IR (KBr) $\mu_{(NH)}=3400$ cm$-1$ $\mu_{(CH)}=2900$ cm$-1$, $\mu_{(P=O)}=1170$ cm$-1$. TGA-onset 270° C.

Note: In Examples 1-4 the term "TGA-onset" refers to the temperature at which decomposition is first observed, using thermogravimetric analysis

EXAMPLE 5

This Example shows, that according to UL94, a 2:1 mixture of Compound A (as prepared in Example 1)/ammonium polyphosphate (APP), (Phoscheck P30, Monsanto) in LDPE (BASF, Lupolen 1812D, Melt Index 0.2) at a 30% flame retardant loading outperforms a zero-halogen Charguard 329 formulation (Great Lakes Chemical Corporation) and a halogenated DBDPO/antimony oxide formulation. The halogenated sample contained 22% DBDPO (decabromodiphenyloxide, Great Lakes Chemical Corporation DE-83) and 8% antimony trioxide, which is known to act as a synergist in this context (Aldrich Chemical Co. 23089-8). A large smoke reduction is observed for both the zero-halogen samples when compared with the halogenated formulation.

| Sample (30%) | UL94 Test (0.32 cm) | Smoke Density (O.D./g) |
|---|---|---|
| Compound A/APP | V-0 | 0.100 |
| Charguard 329 | Fail | 0.080 |
| DBDPO/Sb$_2$O$_3$ | V-2 | 0.800 |

EXAMPLE 6

Variation of Compound A (as prepared in Example 1)/APP (Phoscheck P30) ratio at a 40% flame retardant loading in LDPE (BASF, Lupolen 1812D, melt index 0.2) shows that compositions can be altered to achieve different levels of flammability. Different ratios of Compound A/APP were examined to investigate flammability performance at a 40% loading in LDPE. As shown in the table, V-0 performance was seen with a 2:3 ratio of Compound A:APP.

| Sample (40% in LDPE) | UL94 (0.32 cm) | UL94 (0.16 cm) |
|---|---|---|
| Compound A/APP (2:1) | V-0 | V-2 |
| Compound A/APP (2:3) | V-0 | V-0 |
| Compound A/APP (1:2) | V-0 | V-2 |
| Compound A/APP (1:2) | V-0 | V-2 |

EXAMPLE 7

Variation of Compound A (as prepared in Example 1)/APP (Phoscheck P30) ratio at a 40% flame retardant loading in EEA (BP LE186EA, melt index 6, EA content 18%) shows that according to UL94, Compound A blended in a 2:3 ratio with APP outperforms a Spinflam MF82 (Montefluos) formulation in EEA. A 2:3 ratio of Compound A blended with encapsulated APP (Exolit 462, Hoechst-Celanese) is also V-0 rated.

| Sample (40% in EEA) | UL94 Test (0.16 cm) |
|---|---|
| Compound A/APP (2:1) | V-2 |
| Compound A/APP (2:3) | V-0 |
| Compound A/APP (1:2) | V-2 |
| Spinflam MF82/PP | V-2 |
| Compound A/Encapsulated APP (2:3) | V-0 |

EXAMPLE 8

This Example illustrates the effect of chemical crosslinking on flammability, using EEA copolymer (BP LE186EA, melt index 6, EA content 18%).

Samples were chemically crosslinked using 2% dicumyl peroxide at 170° C. for 20 minutes at 12 tons pressure. The degree of crosslinking was estimated by hot melt modulus measurements.

From the table below it can be seen that Compound A (as prepared in Example 1)/APP (Phoscheck P30) crosslinked in EEA retains its excellent UL94 V-0 rating. outperforming the Spinflam formulation which is degraded by crosslinking.

| Sample (40% in EEA) | UL94 (0.16 cm) non-crosslinked | UL94 (0.16 cm) crosslinked |
| --- | --- | --- |
| Compound A/APP (2:3) | V-0 | V-0 |
| Spinflam MF82/PP | V-2 | Fail |

EXAMPLE 9

This illustrates the effect of chemical crosslinking on flammability, using EVA (Dupont, Elvax 470, Melt Index 0.7, VA content 18%)

Samples were chemically crosslinked using 2% dicumyl peroxide at 170° C. for 20 minutes at 12 tons pressure.

From the table below it can be seen that the Compound A (as prepared in Example 1)/APP (Phoscheck P30)) formulation crosslinked in EVA also obtained a V-0 rating comparable to Spinflam MF82/PP.

| Sample (40% in EVA) | UL94 (0.16 cm) crosslinked |
| --- | --- |
| Compound A/APP (2:3) | V-0 |
| Spinflam MF82/PP | V-0 |

EXAMPLE 10

Copper coated microscope slides were allowed to stand in the products of combustion of the following samples prepared in EEA (BP LE186EA, melt index 6, EA content 18%). The copper surfaces were inspected before and after exposure. The APP used in the Example was Phoscheck P30 (Monsanto).

| Sample | Corrosion Observed |
| --- | --- |
| 40% Compound A/APP (2:3) | None |
| 30% DBDPO/$Sb_2O_3$ (22:8) | Corrosion observed |

A control slide left in the laboratory air for 16 hours showed no visible signs of corrosion. No visible signs of corrosion were observed for the halogen-free sample.

EXAMPLE 11

This Example demonstrates the synergistic effect of the two components of this invention in LDPE (BASF, Lupolen 1812D, melt index 0.2). Three samples containing 30% loadings of APP only, Compound A only and a 2:1 ratio of Compound A (as prepared in Example 1) to APP in LDPE were tested for UL94 at 0.32 cm (⅛"). Only the combined Compound A/APP (Phoscheck P30) sample demonstrated good flammability behaviour. LOI was also observed to increase significantly for this sample.

| Sample (30%) | UL94 Test (0.32 cm) | LOI |
| --- | --- | --- |
| Compound A | Fail | 19 |
| APP | Fail | — |
| Compound A/APP (2:1) | V-0 | 29.6 |

EXAMPLE 12

Compound B (as prepared in Example 2) was formulated with APP (Phoscheck P30) in a 2:3 ratio in EEA (BP LE186 EA, melt index 6, EA content 18%) at a 40% total flame retardant loading. Samples were chemically crosslinked using 2% dicumyl peroxide at 170° C. for 20 minutes at 12 tons pressure.

From the table it can be seen that this formulation shows equivalent flammability performance to Compound A (as prepared in Example 1)/APP at 0.32 cm (⅛"). However, Compound A/APP outperforms this formulation at 0.16 cm (1/16"). A large reduction in smoke density is also observed (equivalent to Compound A/APP) when compared with halogenated formulations (see Example 1).

| Sample (40%) | UL94 (0.32 cm) crosslinked | UL94 (0.16 cm) crosslinked | Smoke Density O.D./g | LOI % |
| --- | --- | --- | --- | --- |
| Compound B/APP (2:3) | V-0 | Fail | 0.088 | 31 |

EXAMPLE 13

Compound C (as prepared in Example 3) was formulated with APP (Phoscheck P30) in a 2:3 ratio in EEA (BP LE186EA, melt index 6, EA content 18%) at a 40% total flame retardant loading. Samples were chemically crosslinked using 2% dicumyl peroxide at 170° C. for twenty minutes at 12 tons pressure.

From the table it can be seen that this formulation shows equivalent flammability performance to Compound A (as prepared in Example 1)/APP at 0.16 cm (1/16").

| Sample (40%) | UL94 (0.16 cm) crosslinked | LOI % |
| --- | --- | --- |
| Compound C/APP (2:3) | V-0 | 36 |
| Compound A/APP (2:3) | V-0 | 34 |

EXAMPLE 14

Compound D (as prepared in Example 4) was formulated with APP (Phoscheck P30) in a 2:3 ratio in EEA (BP LE 186 EA, melt index 6, EA content 18%) at a 40% total flame retardant loading. Samples were chemically cross-linked using 2% dicumyl peroxide at 170° C. for twenty minutes at 12 tons pressure. From the table it can be seen that this formulation shows equivalent flammability performance to Compound A (as prepared in Example 1)/APP at 0.16 cm (1/16").

| Sample (40%) | UL94 (0.16 cm) crosslinked | LOI % |
| --- | --- | --- |
| Compound O/APP (2:3) | V-0 | 29 |
| Compound A/APP (2:3) | V-0 | 34 |

EXAMPLE 15

This sample shows that according to the cone calorimetric parameters rate of heat release, specific extinction area (smoke density) and C0 production, a 2:3 mixture of Compound C (as prepared in Example 3)/ammonium Polyphosphate (APP), (Phoscheck P30, monsanto) in Epikote 815 (Shell Chemicals)/2,4,6-tris (dimethylaminomethyl) phenol (Aldrich Chemical Co.

T5.820-3) (2:1) at 20% flame retardant loading outperforms a zero-halogen formulation—AMGARD CRPA (Albright & Wilson) and a halogenated DBDPO/antimony oxide formulation. The halogenated sample contained an 11:4 ratio of DBDPO (decabromodiphenyl oxide, Great Lakes Chemical Corporation DE-83): antimony trioxide synergist (Aldrich Chemical Co. 23 089-8).

| Sample 20% | Peak Rate of Heat Release (Kwm$^{-2}$) | Peak Specific Extinction Area (m$^2$ Kg$^{-1}$) | Peak CO Production (Kg · Kg$^{-1}$) |
|---|---|---|---|
| Compound C/ APP | 245 | 938 | 0.154 |
| Amgard CRPA | 309 | 1319 | 0.584 |
| DBDPO/S$_2$O$_3$ | 395 | 1355 | 0.385 |

"Amgard" (Albright & Wilson), "Charguard" (Great Lakes Chemical Corporation), "Elvax" (Dupont), "Exolit" (Hoechst-Celanese), "Lupolen" (BASF), "Monsil" (Maillerfer), "Phoscheck" (Monsanto), "Sioplas" (Dow Corning) and "Spinflam" (Montefluos) are Trade Marks.

We claim:

1. A compound consisting essentially of repeating units of general formula (I)

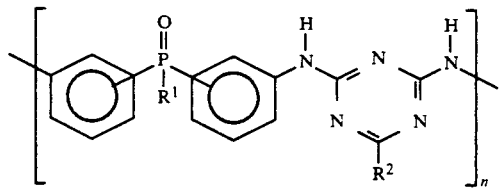

wherein:

n is an integer and has a value of at least 2;

R$^1$ is selected from alkyl groups comprising up to 20 carbon atoms; and

R$^2$ is selected from the group consisting of

wherein

R$^3$ is selected from the group consisting of alkyl groups comprising up to 10 carbon atoms, and piperidine, pyrrolidine and triazole ring nuclei.

2. A compound according to claim 1 wherein:

R$^1$ is selected from the group consisting of ethyl or methyl;

n has a value of from 2 to 12; and

R$^2$ is selected from the group consisting of piperidine, pyrrolidine and triazole ring nuclei.

3. A flame retardant additive comprising:

(i) A compound consisting essentially of repeating units of general formula (I)

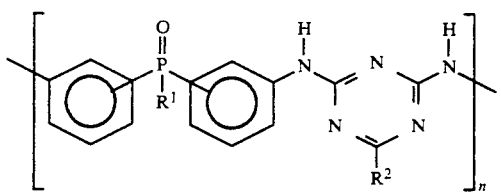

wherein:

n is an integer and has a value of at least 2;

R$^1$ is selected from alkyl groups comprising up to 20 carbon atoms; and

R$^2$ is selected from the group consisting of

wherein

R$^3$ is selected from the group consisting of alkyl groups comprising up to 10 carbon atoms, and piperidine, pyrrolidine and triazole ring nuclei; and (ii) a second source of phosphorous different from said compound.

4. An additive according to claim 3 wherein said source of phosphorus is selected from the group consisting of ammonium polyphosphate, melamine polyphosphate and red phosphorus, each of which group may optionally be encapsulated in a water insoluble resin.

5. An additive according to claim 3 wherein the weight ratio of the compound of formula (I) to the second source of phosphorus is from 4:1 to 1:4.

6. An additive according to claim 3 wherein the compound of formula (I) and the second source of phosphorus have an average particle size of less than 80 μm.

7. A polymer composition comprising from 10 to 60% of the flame retardant additive of claim 3 by weight of the total polymer composition and a polymer selected from the group consisting of homopolymers and copolymers of olefins and hydroxyl containing olefins.

8. A polymer composition according to claim 7 wherein said polymer is selected from the group consisting of low density polyethylene, high density polyethylene, linear, low density polyethylene, poly (ethylene/ethyl acrylate), poly (ethylene/vinyl acetate) polypropylene and ethylene-propylene-diene.

9. A polymer composition according to claim 7 wherein said polymer is cross-linked with the flame retardant additive.

10. A polymer composition according to claim 7 further comprising at least one additive selected from the group consisting of smoke suppressants, antioxidants, heat stabilizers and U.V. stabilizers.

11. A method of producing a compound having a nucleus of general formula (I) comprising the following reaction scheme:

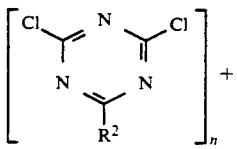

-continued

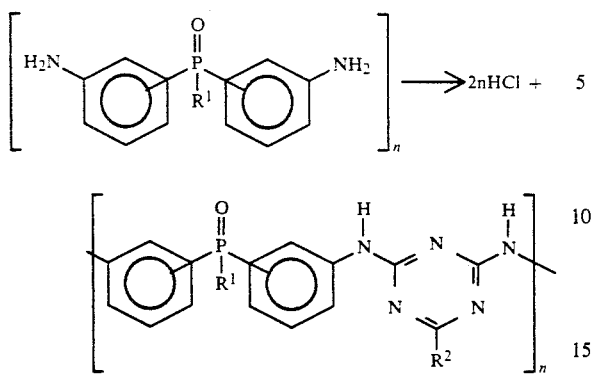

$\longrightarrow$ 2nHCl +

wherein:
n is an integer and has a value of at least 2;
R¹ is selected from alkyl groups comprising up to 20 carbon atoms; and
R² is selected from the group consisting of $$R^3-\overset{|}{N}H$$

wherein

R³ is selected from the group consisting of alkyl groups comprising up to 10 carbon atoms, and piperidine, pyrrolidine and triazole ring nuclei.

12. An oligomer having the general formula (I)

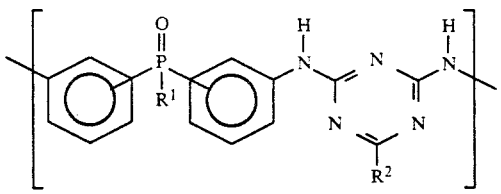

wherein:
R¹ is selected from alkyl groups comprising up to 20 carbon atoms; and R² is selected from the group consisting of $$R^3-\overset{|}{N}H$$

wherein
R³ is selected from the group consisting of alkyl groups comprising up to 10 carbon atoms, and piperidine, pyrrolidine and triazole ring nuclei.

* * * * *